US 6,765,766 B2

(12) United States Patent
Hipwell, Jr. et al.

(10) Patent No.: US 6,765,766 B2
(45) Date of Patent: Jul. 20, 2004

(54) BONDING TUB IMPROVED ELECTROMAGNETIC MICROACTUATOR IN DISC DRIVES

(75) Inventors: Roger Lee Hipwell, Jr., Eden Prairie, MN (US); Peter Crane, Richfield, MN (US); Lee Walter, Plymouth, MN (US); Wayne Allen Bonin, North Oak, MN (US); Zine-Eddine Boutaghou, Vadnais Heights, MN (US); Barry Dean Wissman, Ann Arbor, MI (US); Bruce Charlton Polson, New Prague, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/873,913

(22) Filed: Jun. 4, 2001

(65) Prior Publication Data

US 2002/0008943 A1 Jan. 24, 2002

Related U.S. Application Data

(60) Provisional application No. 60/217,529, filed on Jul. 11, 2000.

(51) Int. Cl.$^7$ .............................. G11B 5/56; G11B 21/24
(52) U.S. Cl. ................................................... 360/294.5
(58) Field of Search ......................... 360/294.5, 294.3, 360/294.1, 290, 260, 264.3–265, 245, 245.3, 78.12, 78.05

(56) References Cited

U.S. PATENT DOCUMENTS

| 3,924,268 A | 12/1975 | McIntosh et al. ............. 360/78 |
| 4,374,402 A | 2/1983 | Blessom et al. ............. 360/104 |

(List continued on next page.)

FOREIGN PATENT DOCUMENTS

| EP | 0 412 221 B1 | 1/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.
"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.
"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.
"Transverse Mode Electrostatic Microactuator for MEMS–Based HDD Slider" by Imamura et al, *IEEE* 1996.

(List continued on next page.)

*Primary Examiner*—A. J. Heinz
*Assistant Examiner*—Angel Castro
(74) *Attorney, Agent, or Firm*—Kinney & Lange, P.A.

(57) ABSTRACT

A microactuator finely positions a transducing head carried by a slider adjacent a select radial track of disc. A frame of the microactuator includes a motor for altering the position of the slider and a closed bonding tub extending upward from the bottom of the microactuator having a bonding surface to engage the top surface of the slider. The closed bonding tub is formed from the microactuator frame such that there is a tub bottom having a bonding surface, sidewalls and an open sidewall.

19 Claims, 6 Drawing Sheets

U.S. PATENT DOCUMENTS

| | | | | |
|---|---|---|---|---|
| 4,651,242 | A | | 3/1987 | Hirano et al. ............... 360/103 |
| 4,764,829 | A | | 8/1988 | Makino ...................... 360/106 |
| 4,914,725 | A | | 4/1990 | Belser et al. ............... 318/560 |
| 5,021,906 | A | | 6/1991 | Chang et al. ............... 360/103 |
| 5,034,828 | A | | 7/1991 | Ananth et al. ................ 360/75 |
| 5,177,652 | A | | 1/1993 | Yamaguchi et al. ..... 360/78.05 |
| 5,189,578 | A | | 2/1993 | Mori et al. .................. 360/106 |
| 5,303,105 | A | | 4/1994 | Jorgenson ................... 360/106 |
| 5,364,742 | A | | 11/1994 | Fan et al. .................... 430/317 |
| 5,375,033 | A | | 12/1994 | MacDonald ................ 361/281 |
| 5,521,778 | A | | 5/1996 | Boutaghou et al. ......... 360/106 |
| 5,657,188 | A | | 8/1997 | Jurgenson et al. .......... 360/106 |
| 5,745,319 | A | | 4/1998 | Takekado et al. ........ 360/78.05 |
| 5,764,444 | A | | 6/1998 | Imamura et al. ............ 360/109 |
| 5,781,381 | A | | 7/1998 | Koganezawa et al. ...... 360/106 |
| 5,796,558 | A | | 8/1998 | Hanrahan et al. ........... 360/106 |
| 5,801,472 | A | | 9/1998 | Wada et al. ................. 310/309 |
| 5,805,375 | A | | 9/1998 | Fan et al. ................. 360/78.12 |
| 5,856,896 | A | | 1/1999 | Berg et al. .................. 360/104 |
| 5,863,024 | A | | 1/1999 | Blind et al. ............ 251/129.01 |
| 5,867,347 | A | | 2/1999 | Knight et al. ............... 360/104 |
| 5,896,246 | A | | 4/1999 | Budde et al. ............... 360/104 |
| 5,898,541 | A | | 4/1999 | Boutaghou et al. ......... 360/106 |
| 5,898,544 | A | | 4/1999 | Krinke et al. ............... 360/104 |
| 5,920,441 | A | | 7/1999 | Cunningham et al. ... 360/78.05 |
| 5,936,805 | A | | 8/1999 | Imaino ........................ 360/104 |
| 5,945,898 | A | | 8/1999 | Judy et al. ..................... 335/78 |
| 5,959,808 | A | | 9/1999 | Fan et al. .................... 360/106 |
| 6,043,957 | A | | 3/2000 | Hattori et al. ............... 360/106 |
| 6,064,550 | A | | 5/2000 | Koganezawa ............... 360/106 |
| 6,198,606 | B1 | * | 3/2001 | Boutaghou et al. ...... 360/294.3 |
| 6,351,354 | B1 | * | 2/2002 | Bonin ...................... 360/294.6 |
| 6,362,939 | B1 | * | 3/2002 | Crane et al. ............. 360/294.5 |
| 6,396,667 | B1 | * | 5/2002 | Zhang et al. ............ 360/294.3 |
| 6,414,822 | B1 | * | 7/2002 | Crane et al. ............. 360/294.5 |
| 6,414,823 | B1 | * | 7/2002 | Crane et al. ............. 360/294.5 |
| 6,473,274 | B1 | * | 10/2002 | Maimone et al. ........ 360/294.5 |
| 6,493,192 | B2 | * | 12/2002 | Crane et al. ............. 360/294.3 |
| 6,501,623 | B1 | * | 12/2002 | Sassolini et al. ......... 360/245.3 |
| 6,535,360 | B1 | * | 3/2003 | Kim et al. ............... 360/294.3 |

OTHER PUBLICATIONS

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–126.

"A Dual–Stage Magnetic Disk Drive Actuator Using a Piezoelectric Device for a High Track Density" Mori et al., *IEEE Transactions on Magnetics*, vol. 27, No. 6, Nov. 1991.

"Dynamic Loading Criteria for 3–1/2 Inch HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

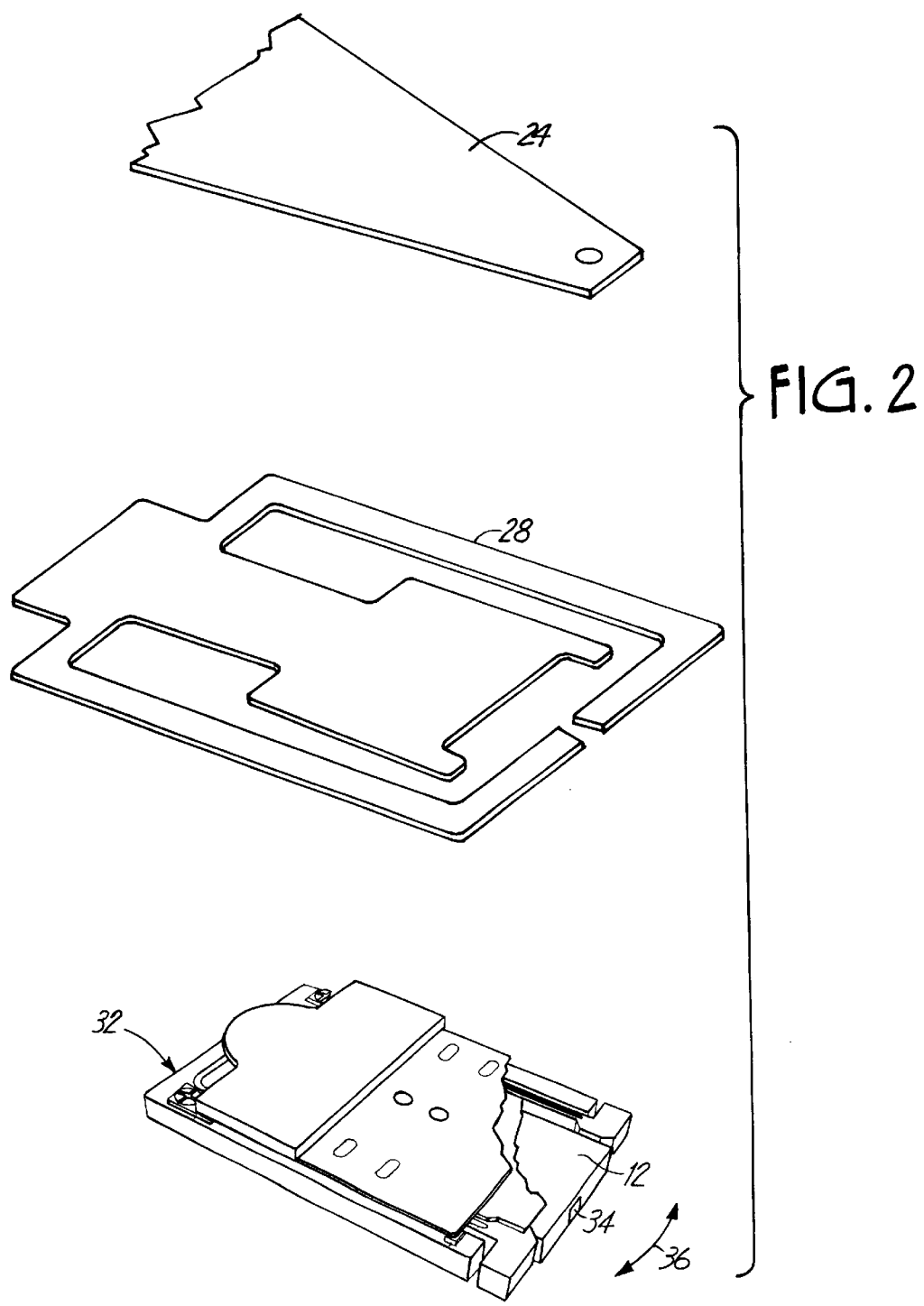

BONDING TUB IMPROVED ELECTROMAGNETIC MICROACTUATOR IN DISC DRIVES

CROSS-REFERENCE TO RELATED APPLICATION(S)

This application claims priority from Provisional Application No. 60/217,529, filed Jul. 11, 2000 for "Bonding Tub for Improved Electromagnetic Microactuator In Disc Drives" by Roger L. Hipwell, Jr., Peter Crane, Lee Walter, Wayne A. Bonin, Zine-Eddine Boutaghou, Barry D. Wissman, and Bruce C. Polson.

BACKGROUND OF THE INVENTION

The present invention relates to a disc drive microactuator system and more particularly to an improved structure and fabrication method for precise placement of components in an electromagnetic microactuator.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a slider (which carries the head) on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One particular design for high resolution head positioning involves employing a high resolution microactuator in addition to the conventional lower resolution actuator motor, thereby effecting head positioning through dual stage actuation. Various microactuator designs have been considered to accomplish high resolution head positioning. In particular, magnetic microactuator designs featuring a magnet/keeper assembly and coil have been developed. Magnetic microactuators typically include a stator portion and a rotor portion, the stator being attached to the flexure and the rotor supporting the slider. The rotor is movable with respect to the stator such that the slider can be positioned more precisely over a track of a disc.

One challenge of current microactuator design is the positioning and placement of the slider when bonding it into the rotor. Presently, magnetic microactuators have very small tolerances in the relative location and separation distance between components. Current designs of magnetic microactuators have rotors with apertures for the placement of sliders into the microactuator. Apertures are also used for the placement of magnets into the microactuator. Use of apertures does not allow precise control of the separation distance between the magnet and the drive/sense coils, meaning that labor-intensive procedures must be employed during assembly to achieve the proper component spacing and positioning. Increasing the ease of positioning a slider or magnet into the microactuator by use of a positioning reference would decrease the costs of assembly. In particular, positioning references would provide a convenient and local method of properly placing and positioning a slider or magnet into the microactuator.

BRIEF SUMMARY OF THE INVENTION

The present invention is a microactuator for a disc drive. The microactuator finely positions a transducing head above a track on the disc. The transducing head is carried by a slider attached to the frame of the microactuator.

An exemplary embodiment of the microactuator utilizes a bonding tub to secure the slider to the microactuator frame. The bonding tub is formed with a tub cover. The top surface of the slider is engaged to a planar bonding surface on the bottom of the tub cover.

Another embodiment has a bonding tub to engage magnets used for a magnetic microactuator. The bonding tub for the magnets extends upwardly from the bottom of the microactuator frame and has a tub cover at the closed top end of the tub. The top surface of the magnets are engaged to a bonding surface on the bottom of the tub cover and the bottom surface of the magnets are secured to a bottom keeper.

BRIEF DESCRIPTION OF THE DRAWINGS

FIG. 2 is an exploded perspective view of a portion of a disc drive including a microactuator according to the present invention, with portions broken away.

DETAILED DESCRIPTION

Figure 1:
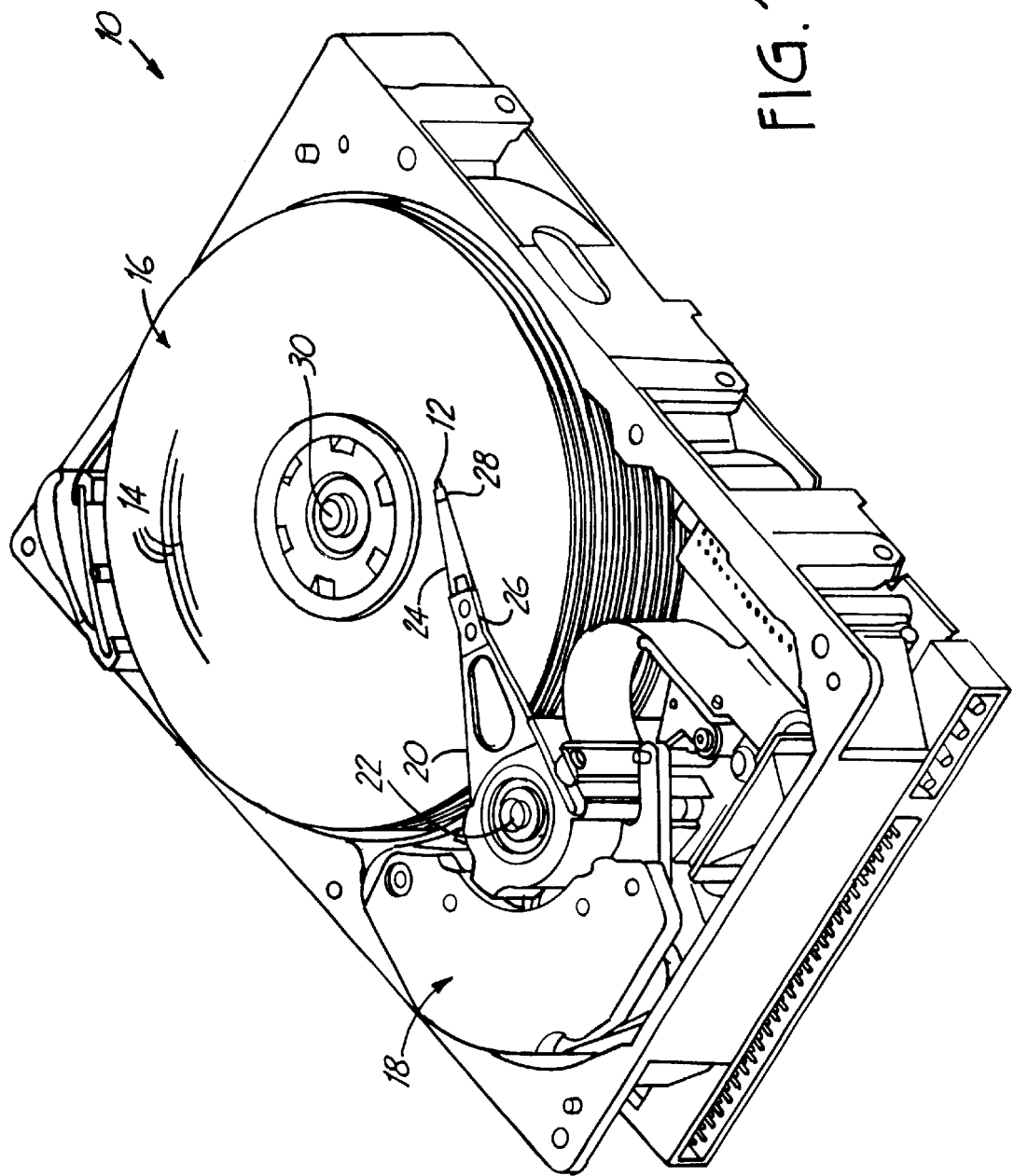
FIG. 1 is a perspective view of a conventional disc actuation system for positioning a slider over a track of a disc.

FIG. 1 is a perspective view of disc drive actuation system 10 for positioning slider 12 over track 14 of disc 16. Actuation system 10 includes voice coil motor (VCM) 18 arranged to rotate actuator arm 20 on a spindle around axis 22. Head suspension 24 is connected to actuator arm 20 at head mounting block 26. Flexure 28 is connected to an end of head suspension 24, and carries slider 12. Slider 12 carries a transducing head (not shown in FIG. 1) for reading and/or writing data on concentric tracks 14 of disc 16. Disc 16 rotates around axis 30, so that windage is encountered by slider 12 to keep it aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks significant resolution and frequency response to position a transducing head on slider 12 precisely over a selected track 14 of disc 16. Therefore, a higher resolution actuation device is necessary.

FIG. 2 is an exploded perspective view of a portion of a disc drive including microactuator 32 for high resolution head positioning. Flexure 28 is attached to head suspension 24 and microactuator 32 is attached to flexure 28. Microactuator 32 carries slider 12 above a surface of disc 16. Transducing head 34 is carried by slider 12 to write and read data to and from the disc. In operation, head suspension 24, flexure 28, and microactuator 32 carrying slider 12 are all moved together as coarse positioning is performed by VCM 18 (FIG. 1) as it moves actuator arm 20 (FIG. 1). To achieve fine positioning of transducing head 34, microactuator 32 generates a force which causes bending of beam springs associated with microactuator 32 (as discussed below with respect to FIGS. 3A and 3B). As a result, the portion of microactuator 32 carrying slider 12 moves slightly with respect to flexure 28 in the direction of arrows 36, displacing transducing head 34 with high resolution for precise positioning of transducing head 34 over a selected track of the disc.

Figure 3A:
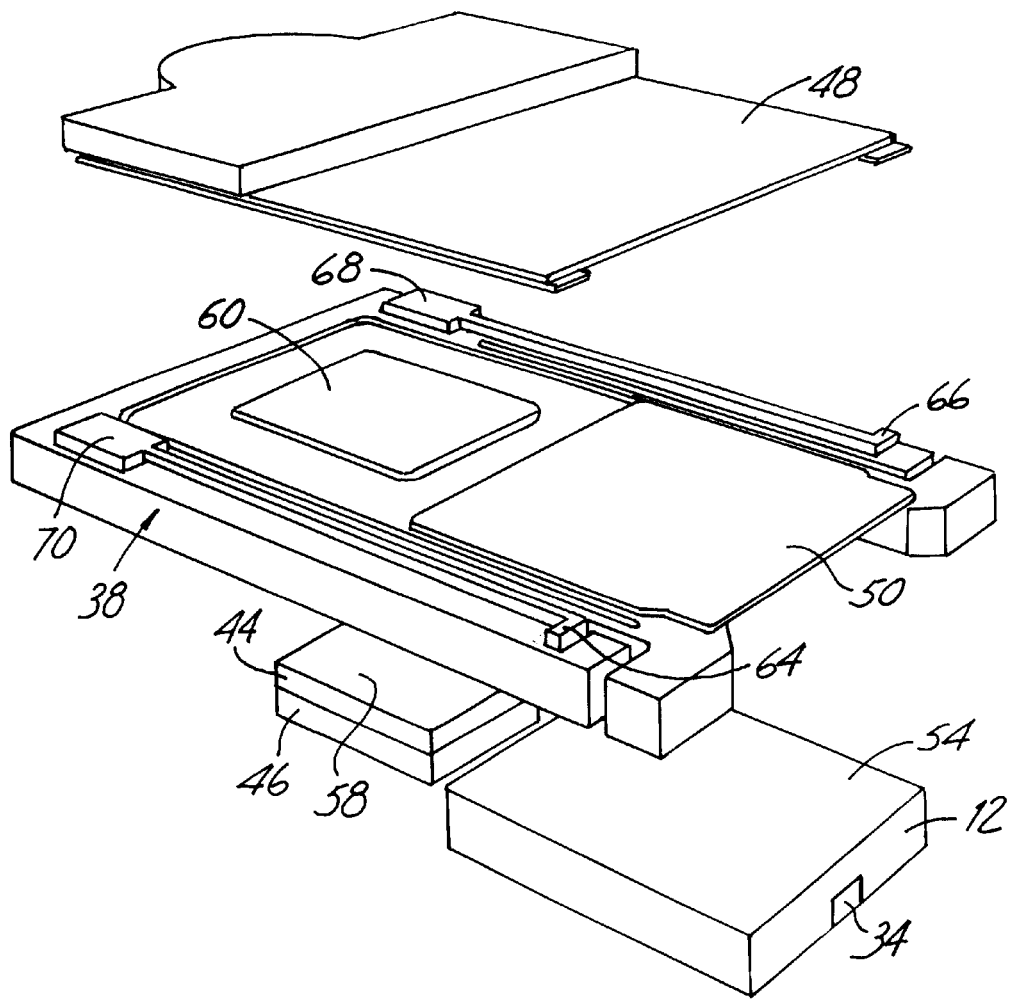
FIG. 3A is an exploded top perspective view of a microactuator system for positioning a slider over tracks of a disc according to the present invention.
Figure 3B:
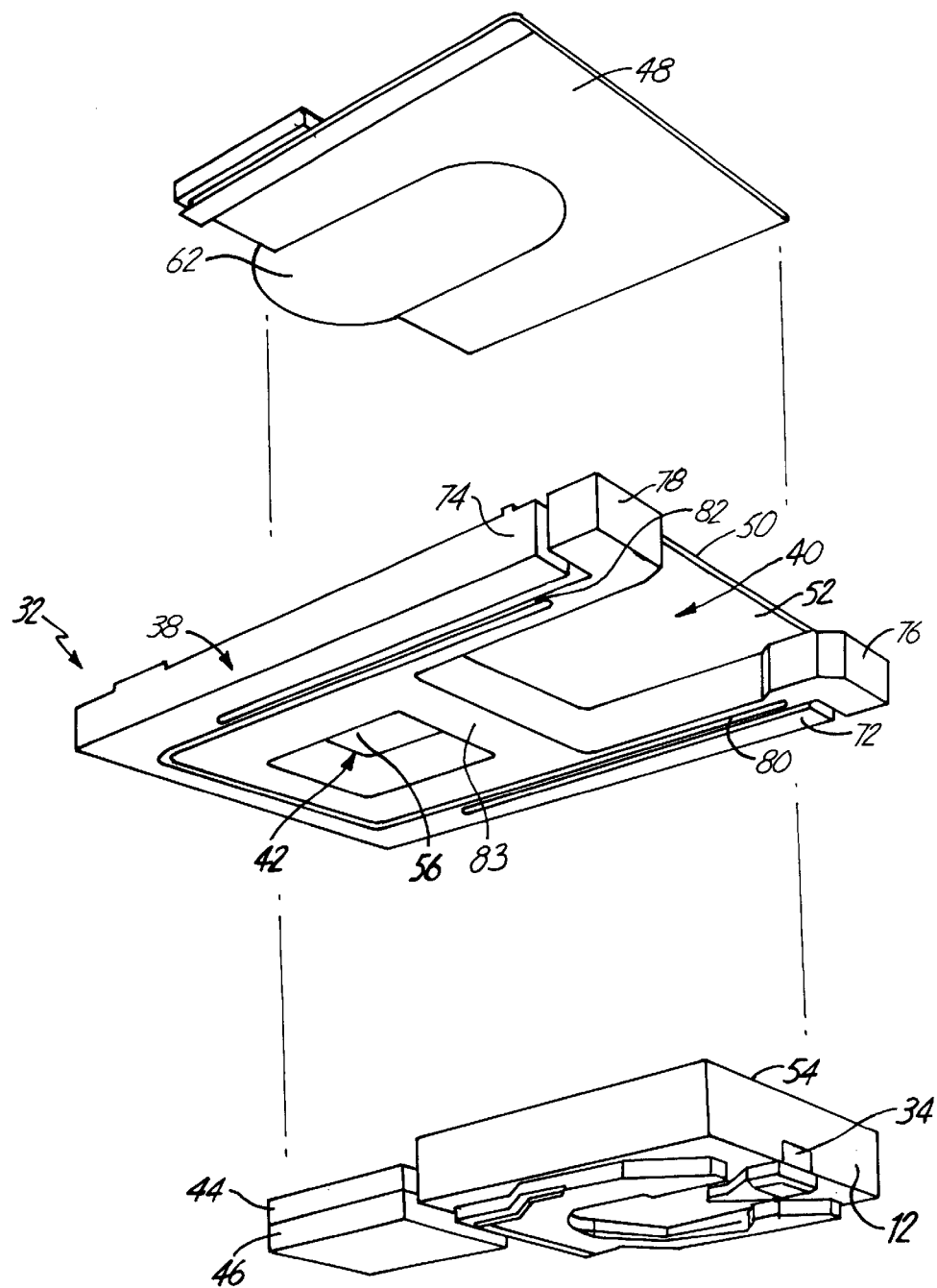
FIG. 3B is an exploded bottom perspective view of a microactuator system for positioning a slider over tracks of a disc according to the present invention.

FIGS. 3A and 3B are exploded perspective views of microactuator 32 together with slider 12. FIG. 3A is an exploded top perspective view and FIG. 3B is an exploded bottom perspective view. Microactuator 32 comprises microactuator frame 38, slider bonding tub 40, magnet bonding tub 42, magnets 44, bottom keeper 46, and coil-on-keeper assembly 48. Slider bonding tub 40 has a tub cover 50 comprising the closed top end of the tub. A planar bonding surface 52 is formed on the bottom of tub cover 50. Slider 12 is received into slider bonding tub 40 through the open bottom end of tub 40. A top surface 54 of the slider 12 is engaged to bonding surface 52 of slider bonding tub 40. Magnet bonding tub 42 has a planar bonding surface 56 for receiving top surface 58 of magnets 44. The top closed end of tub 42 is magnet tub cover 60 and bonding surface 56 is on the bottom of tub cover 60. Bottom keeper 46 is attached to a bottom surface of magnets 44.

Coil-on-keeper assembly 48 carries drive coil 62. Coil-on-keeper assembly 48 is attached to microactuator frame 38 such that drive coil 62 forms a magnetic circuit with magnets 44. Drive coil 62 acts with magnets 44 and bottom keeper 46 as a motor to move a portion of microactuator 32. Microactuator 32 is actuated by circulating a current through the windings of drive coil 62. The details of the magnetic circuit are disclosed in U.S. application Ser. No. 09/657,984 which has been incorporated herein by reference. Stand-offs 64, 66, 68 and 70 are located on the top of microactuator frame 38 and are used to attach coil-on-keeper assembly 48 to microactuator frame 38.

Microactuator frame 38 is comprised of outer bars 72, 74 and inner alignment clips 76, 78. Flexible beam springs 80, 82 extend along bars 72, 74. The outer bars 72, 74 form a portion of the stator, while flexible beams 80, 82, inner alignment clips 76, 78 and the portion of microactuator frame 38 where the magnet bonding tub 42, magnets 44 and bottom keeper 46 are located form the rotor of microactuator 32. Inner alignment clips 76 and 78 of the rotor form at least two sidewalls of slider bonding tub 40 and support slider 12. A rear wall 83 is a third wall of slider bonding tub 40. Rear wall 83 is located between slider bonding tub 40 and magnet bonding tub 42, such that it forms a part of the rotor. Each flexible beam spring 80 and 82 attaches to a distal end of an inner alignment clip 76 and 78, respectively. Flexible beam springs 80 and 82 extend longitudinally proximal and attach to a proximal end of outer preloading bar 72 and 74, respectively. Flexible beam springs 80 and 82 thereby connect the rotor (via inner alignment clips 76 and 78) to the stator (via outer preloading bars 72 and 74).

A magnetic circuit created between magnets 44 and drive coil 62 is used to actuate microactuator 32. Once actuated, microactuator 32 radially moves the rotor in the direction of arrows 36. Slider bonding tub 40 holds slider 12 and is supported by inner alignment clips 76, 78 and rear wall 83 of the rotor. The radial movement of the rotor, and thereby slider bonding tub 40, finely positions slider 12 over a track of the disc. Flexible beam springs 80 and 82 allow slider 12 to be carried in the horizontal plane. The details of beam structure are disclosed in U.S. application Ser. No. 09/071,611 which has been incorporated herein by reference.

Figure 4:
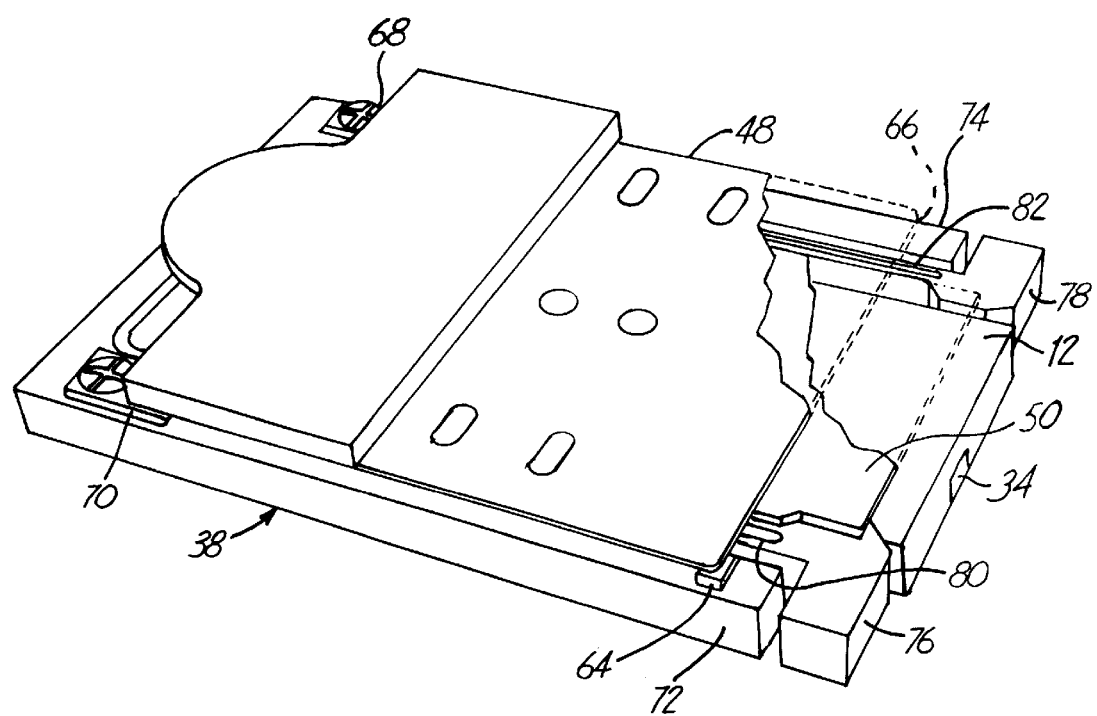
FIG. 4 is a top perspective view of a microactuator, with portions broken away.

FIG. 4 is a top perspective view of microactuator 32. On top of microactuator frame 38 is tub cover 50, the bottom of which has planar bonding surface 52 engaged to top surface 54 of slider 12. Coil-on-keeper assembly 48 is attached to microactuator frame 38 at stand-offs 64, 66, 68, and 70. Drive coil 62 is located above magnets 44 (as shown in FIGS. 3A and 3B) to create a magnetic circuit. The magnetic circuit actuates microactuator 32, causing the rotor to finely position transducing head 34 carried by slider 12.

In accordance with the present invention, slider 12 is carried by slider bonding tub 40. Slider bonding tub 40 has tub cover 50, the bottom of which forms bonding surface 52. There is an open sidewall where the trailing end of slider 12 carrying transducing head 34 is located. The trailing end of slider 12 carrying transducing head 34 extends beyond the open sidewall of slider bonding tub 40. Slider 12 is positioned in slider bonding tub 40 by engaging the top surface 54 of slider 12 to the bonding surface 52. Actuation of the microactuator 32 radially moves the rotor, thereby moving slider bonding tub 40 carrying slider 12. Transducing head 34 carried by slider 12 is therefore finely positioned over a track of the disc.

In an alternative embodiment of microactuator 32, magnets 44 are carried by magnet bonding tub 42. Magnet bonding tub 42 has a planar bonding surface 56 on the bottom of tub cover 60 and at least four sidewalls. Magnets 44 are positioned in magnet bonding tub 42 by engaging top surface 58 of magnets 44 to the bonding surface 56 of magnet bonding tub 42.

In one embodiment the planar bonding surfaces 52, 56 of bonding tubs 40, 42 are formed by micromachining the tubs into microactuator frame 38. The microactuator frame 38 is made of silicon in an exemplary embodiment. In other alternative embodiments, bonding surfaces 52, 56 are formed by depositing a film membrane, such as epoxy, on top of microactuator frame 38. Alternatively a film membrane is embedded onto the microactuator frame 38. In both processes the bonding tubs 40, 42 are subsequently etched into microactuator frame 38. The film membrane is not etched to produce a bonding surface, and may also itself serve as an etch stop.

Figure 5:
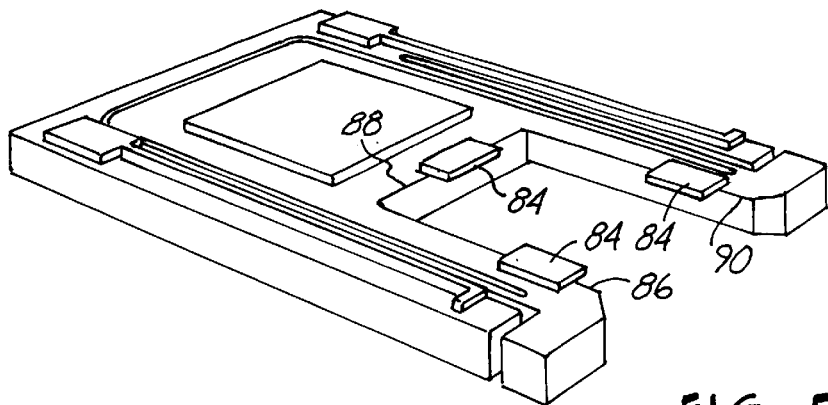
FIG. 5 is a top perspective view of a microactuator frame utilizing bonding tabs to engage a slider to a rotor.
Figure 6:
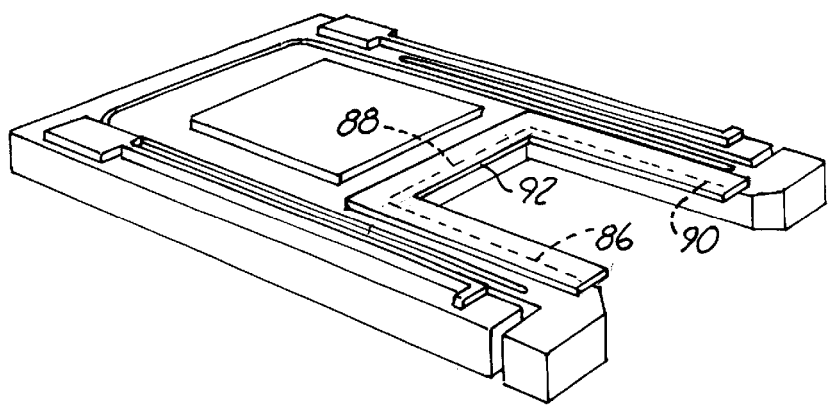
FIG. 6 is a top perspective view of a microactuator frame utilizing a bonding ledge to engage a slider to a rotor.
Figure 7:
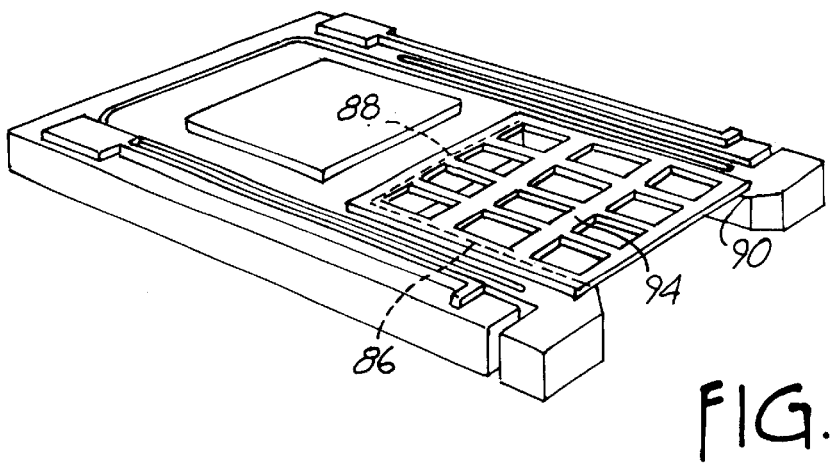
FIG. 7 is a top perspective view of a microactuator frame utilizing a bonding grid to engage a slider to a rotor.

In further alternative embodiments of microactuator 32, bonding surfaces 52, 56 of tubs 40, 42 are replaced with either bonding tabs (as seen in FIG. 5), a bonding ledge (as seen in FIG. 6) or a bonding grid (as seen in FIG. 7). In, one alternative embodiment shown in FIG. 5, the bonding surface 52 of tub 40 is comprised of bonding tabs 84. Tabs 84 are attached intermittently along the three edges 86, 88 and 90 between microactuator frame 38 and tub bottom 50. Tabs 84 project over bonding tub 40 and engage the top surface 54 of slider 12.

Another alternative embodiment of microactuator 32 shown in FIG. 6, replaces bonding surface 52 of tub 40 with a bonding ledge 92. Bonding ledge 92 is attached continuously along three edges 86, 88 and 90 between microactuator frame 38 and tub 40. Ledge 92 extends partially over bonding tub 40 and engages the top surface 54 of slider 12.

FIG. 7 shows an alternative embodiment of microactuator 32 where bonding surface 52 of tub 40 is replaced with a bonding grid 94. Bonding grid 94 extends between the three edges 86, 88 and 90 of bonding tub 40 and over the entire tub 40. Grid 94 has a lattice framework and is attached to each edge (86, 88 and 90) of bonding tub 40. The grid engages the top surface 54 of slider 12.

As can be seen in FIG. 3B, bonding surfaces 52, 56 provide improved positioning reference for placing slider 12 and magnets 44 during assembly. Use of bonding surfaces 52, 56 for placement of slider 12 and magnets 44 is cost effective and efficient. Prior art apertures for placement of sliders and magnets had high tooling and assembly costs. Slider 12 and magnets 44 were first placed in the aperture and then finely positioned into place. The present invention enables wafer-level assembly or individual pick-and-place assembly by using bonding surfaces 52, 56 as a positioning reference. A positioning reference insures precise positioning of slider 12 and magnets 44 and reduces the manufacturing costs of assembly and fixturing. Bonding surfaces 52, 56 within tubs 40, 42 also provide a location and enclosure for bonding adhesive. The enclosure prevents the bonding adhesive from entering the close proximity to critical moving parts of microactuator 32.

Precise positioning of the height of slider 12 with relationship to the microactuator frame 38 is required to maintain precise head-to-disc spacing. Use of the bonding surface 52 improves the preciseness of positioning slider 12 by acting as a reference during placement of the slider into tub 40. The bonding surface 52 is uniform and located a specific distance into microactuator frame 38. Engaging the top surface 54 of slider 12 to bonding surface 52 ensures the height of slider 12 has been precisely established with respect to microactuator frame 38 without resorting to timely and costly tooling and assembly methods for microactuators.

Magnet bonding tub 42 allows precise control over the separation distance between magnets 44 and drive coils 62. Bonding surface 56 on the bottom of tub cover 60 provides a positioning reference for placement of magnets 44 into bonding tub 42. Bonding surface 56 has a uniform plane and is located a specific distance into microactuator frame 38. The top surface of magnets 44 are engaged to bonding surface 56, ensuring that a precise distance exists between magnets 44 and drive coil 62. Bottom keeper 46 is engaged to the bottom of magnets 44 and sits within bonding tub 42 as well. An exact separation distance is required between magnets 44 and drive coils 62 to control the magnetic circuit created between the top of magnets 44 and drive coil 62 and thereby permit greater control over the resolution movement for finely positioning slider 12.

Although the present invention has been described with reference to preferred embodiments, workers skilled in the art will recognize that changes may be made in form and detail without departing from the spirit and scope of the invention.

What is claimed is:

1. A microactuator for finely positioning a transducing head carried by a slider adjacent a select radial track of a disc, the microactuator comprising:

a microactuator frame including a motor for altering a position of the slider; and a slider bonding tub extending upward from a bottom of the microactuator frame and having a bonding surface to engage a top surface of the slider.

2. The microactuator of claim 1 wherein the bonding surface defines a closed end of the slider bonding tub.

3. The microactuator of claim 1 wherein the slider bonding tub is etched into the microactuator frame to form the bonding surface.

4. The microactuator of claim 1 wherein the bonding surface is comprised of silicon or a film membrane.

5. A microactuator for finely positioning a transducing head carried by a slider adjacent a select radial track of a disc, the microactuator comprising:

a microactuator frame having a stator and having a rotor, the rotor being moveable with respect to the stator and having a top surface; and a slider bonding tub cover connected to the top surface of the rotor, the slider bonding tub cover having a planar bonding surface to engage a top surface of the slider wherein the slider bonding tub cover and the rotor define a slider bonding tub.

6. The microactuator of claim 5 wherein the slider bonding tub cover defines a closed end of the slider bonding tub.

7. The microactuator of claim 5 wherein the microactuator frame and the slider bonding tub cover are comprised of a first material.

8. The microactuator of claim wherein the first material is silicon.

9. A microactuator for finely positioning a transducing head carried by a slider adjacent a select radial track of a disc, the microactuator comprising:

a microactuator frame including a motor having at least one magnet for altering a position of the slider;

a slider bonding tub extending upward from a bottom of the microactuator frame and having a bonding surface to engage a top surface of the slider; and a magnet bonding tub extending upward from the bottom of the microactuator frame and having a bonding surface to engage a top surface of the at least one magnet.

10. The microactuator of claim 9 further comprising:

a bottom keeper on a bottom surface of the at least one magnet.

11. A microactuator for finely positioning a transducing head carried by a slider adjacent a select radial track of a disc, the microactuator comprising:

a microactuator frame including a motor for altering a position of the slider; and a slider bonding tub extending upward from a bottom of the microactuator frame and having a bonding surface to engage a top surface of the slider wherein the bonding surface comprises a plurality of bonding tabs to engage the top surface of the slider.

12. A microactuator for finely positioning a transducing head carried by a slider adjacent a select radial track of a disc, the microactuator comprising:

a microactuator frame including a motor for altering a position of the slider; and a slider bonding tub extending upward from a bottom of the microactuator frame and having a bonding surface to engage a top surface of the slider wherein the bonding surface comprises a bonding ledge to engage the top surface of the slider.

13. A microactuator for finely positioning a transducing head carried by a slider adjacent a select radial track of a disc, the microactuator comprising:

a microactuator frame including a motor for altering a position of the slider; and a slider bonding tub extending upward from a bottom of the microactuator frame and having a bonding surface to engage a top surface of the slider wherein the bonding surface is a bonding grid to engage the top surface of the slider.

14. A micro actuator for finely positioning a transducing head carried by a slider adjacent a select radial track of a disc, the microactuator comprising:
- a microactuator frame having a stator and having a rotor, the rotor being moveable with respect to the stator and having a top surface;
- a slider bonding tub cover connected to the top surface of the rotor, the slider bonding tub cover having a planar bonding surface to engage a top surface of the slider wherein the slider bonding tub cover and the rotor define a slider bonding tub;
- a magnet; and
- a magnet bonding tub cover connected to the top surface of the rotor, the magnet bonding tub cover having a planar bonding surface to engage a top surface of the magnet wherein magnet bonding tub cover and the rotor define a magnet bonding tub.

15. The microactuator of claim 14, further comprising:
- a bottom keeper engaged to a bottom surface of the magnet.

16. The microactuator of claim and further comprising:
- a bottom keeper engaged to a bottom surface of the magnet.

17. A micro actuator for finely positioning a transducing head carried by a slider adjacent a select radial track of a disc, the microactuator comprising:
- a microactuator frame having a stator and having a rotor, the rotor being moveable with respect to the stator and having a top surface; and
- a slider bonding tub cover connected to the top surface of the rotor, the slider bonding tub cover having a planar bonding surface to engage a top surface of the slider wherein the slider bonding tub cover and the rotor define a slider bonding tub wherein the bonding surface comprises a plurality of bonding tabs to engage the slider.

18. A microactuator for finely positioning a transducing head carried by a slider adjacent a select radial track of a disc, the microactuator comprising:
- a microactuator frame having a stator and having a rotor, the rotor being moveable with respect to the stator and having a top surface; and
- a slider bonding tub cover connected to the top surface of the rotor, the slider bonding tub cover having a planar bonding surface to engage a top surface of the slider wherein the slider bonding tub cover and the rotor define a slider bonding tub wherein the bonding surface comprises a bonding ledge to engage the slider.

19. A microactuator for finely positioning a transducing head carried by a slider adjacent a select radial track of a disc, the microactuator comprising:
- a microactuator frame having a stator and having a rotor, the rotor being moveable with respect to the stator and having a top surface; and
- a slider bonding tub cover connected to the top surface of the rotor, the slider bonding tub cover having a planar bonding surface to engage a top surface of the slider wherein the slider bonding tub cover and the rotor define a slider bonding tub wherein the bonding surface comprises a bonding grid to engage the slider.

* * * * *

UNITED STATES PATENT AND TRADEMARK OFFICE
CERTIFICATE OF CORRECTION

PATENT NO. : 6,765,766 B2
DATED : July 20, 2004
INVENTOR(S) : Roger Lee Hipwell Jr. et al.

It is certified that error appears in the above-identified patent and that said Letters Patent is hereby corrected as shown below:

Column 6,
Line 19, after "claim", insert -- 7 --

Column 7,
Line 22, after "claim", insert -- 14 --

Signed and Sealed this

Twenty-sixth Day of July, 2005

JON W. DUDAS
*Director of the United States Patent and Trademark Office*